United States Patent [19]
Beck

[11] Patent Number: 6,050,578
[45] Date of Patent: Apr. 18, 2000

[54] LOG TRAILER LOAD BOOSTER

[76] Inventor: David R. Beck, S. 165 W. Lakeview Dr., Kettle Falls, Wash. 99141

[21] Appl. No.: 09/085,141

[22] Filed: May 26, 1998

[51] Int. Cl.$^7$ ........................................................ B60P 9/00
[52] U.S. Cl. .......................... 280/86.5; 92/13.7; 280/404
[58] Field of Search .................................. 280/86.5, 400, 280/401, 402, 403, 404, 405.1, 43, 124.123; 180/204; 92/13.7

[56] References Cited

U.S. PATENT DOCUMENTS

| | | | |
|---|---|---|---|
| 4,219,210 | 8/1980 | Genberg | 280/401 |
| 4,966,383 | 10/1990 | Sjostrom | 280/404 |
| 5,110,149 | 5/1992 | Dahlstrom | 280/401 |
| 5,127,698 | 7/1992 | Whitehead | 280/404 |
| 5,163,698 | 11/1992 | Evens | 280/404 |
| 5,383,714 | 1/1995 | Hunter | 92/13.7 |
| 5,540,454 | 7/1996 | VanDenberg et al. | 280/86.5 |
| 5,549,322 | 8/1996 | Hauri | 280/86.5 |
| 5,713,424 | 2/1998 | Christenson | 280/86.5 |
| 5,823,629 | 10/1998 | Smith et al. | 280/86.5 |

OTHER PUBLICATIONS

Better Weigh Manufacturing advertisement, published Aug. 1996 in *Log Trucker*, vol. 21, No. 8, p. 9.

*Primary Examiner*—Brian L. Johnson
*Assistant Examiner*—Michael Britton
*Attorney, Agent, or Firm*—Wells, St. John, Roberts, Gregory & Matkin, P.S.

[57] ABSTRACT

A log trailer load booster is described for construction in combination with or attachment to a log trailer having a wheeled trailer frame, a payload receiving bunk on the trailer frame, and an elongated trailer beam for connection to a log truck. The booster includes an elongated booster frame with a pivot connection on the booster frame configured to pivotably connect the booster frame to the trailer frame for up and down pivotal movement about a horizontal axis. A booster axle is mounted by a suspension on the booster frame. A link is configured to connect the trailer frame and booster frame and is selectively operable between a locked condition in which upward pivotal movement of the booster frame relative to the trailer frame about the horizontal axis is limited and an unlocked condition in which the booster frame is allowed substantially free pivotal movement about the horizontal axis relative to the trailer frame. A load transfer device is mounted to the booster frame and is selectively operable to axially lift the booster frame about the horizontal axis with respect to the booster axle against the link (when locked against compression) to transfer payload to the booster axle.

25 Claims, 7 Drawing Sheets

LOG TRAILER LOAD BOOSTER

TECHNICAL FIELD

The present invention relates to increasing the load carrying capability of log trailers and more particularly to load boosters for log trailers.

BACKGROUND OF THE INVENTION

Logging trailers have special requirements for off-road conditions. For example it is desirable for the trailer axles to travel significant vertical distances to enable a heavy payload of logs to be carried over rough terrain. Axle travel is accomplished by a pivot point where the trailer axles attach to the trailer frame. Another pivot point is found between the trailer bunk (an upright "U"-shaped frame used to receive the logs) and the trailer frame. The bunk will typically pivot about an upright axis to enable articulation of the trailer relative to the log load as the truck moves around a curve. Log trucks are thereby capable of carrying a relatively long load of logs around fairly sharp corners without the log load "cutting" through the inside of the corner. These features, plus the need for lifting the unloaded trailer onto the truck frame for transport, are at least somewhat unique to log trailers.

Some of the features provided on log trailers are intended primarily for use on narrow unpaved logging roads, where road conditions are typically not nearly as favorable as paved highways. The same features become of secondary importance during highway transport. In fact other features become desirable. For example, it is more desirable on paved roadways for loaded logging trucks to meet certain load limit requirements for each load bearing axle. Such load limitations are seldom required on unpaved logging roads.

Booster axles have been developed in the past for log truck trailers; to relieve some of the payload carried by the trailer axles and thereby meet roadway weight distribution restrictions. However, several of the prior boosters have not been totally satisfactory in both highway and logging road conditions.

At least some of the retrofit log trailer boosters require extensive modification of the original trailer frame. Retrofitting thus becomes a significantly expensive operation.

Another fairly typical problem with prior forms of log trailer load boosters is that some prior boosters do not track well behind the trailer frame, especially "steerable" boosters that are articulated about a slight off-vertical axis. It happens in certain conditions that such boosters may "fishtail" at highway speeds, creating a serious safety hazard. Also "steerable" boosters cannot be conveniently moved backwardly without frequently "jackknifing."

A still further problem with prior log trailer load boosters is discovered when the trailer is unloaded. It is very desirable to carry unloaded trailers on the truck, thereby significantly shortening the overall length of the vehicle. An unloaded truck may then be easily driven to a landing where the trailer is unloaded by a nearby log loader (if one is not provided on the truck) and hitched to the truck before loading. A trailer with a prior load booster may well be too heavy for convenient hoisting by many small capacity log loaders.

Another problem is that existing boosters will often require a special framework or "ride" that must be retrofitted to the truck chassis to receive and carry the booster when the trailer is carried on the truck. Thus the added weight of the booster and "ride" can detract from truck fuel efficiency and overall load carrying capacity.

A need has therefor been realized for a log trailer load booster that will minimize or eliminate the above problems. The present invention is intended to fill this need by providing a relatively light weight, positively tracking log trailer booster which: (a) is easily adapted to an existing log trailer without requiring extensive modification of the trailer or truck chassis; (b) will function in either of two selective modes, an inoperative, relatively freely suspended mode for operation along logging roads, so the booster will not interfere with normal handling of the trailer on logging roads, and a weight transfer mode for operation along load restricted roadways; (c) can be moved rearwardly in either mode without jackknifing; and (d) is light weight enough to be loaded onto a truck and unloaded by relatively light duty log loaders.

The above and still further objects and advantages will be better understood from the following description which, taken with the accompanying drawings, describe the best mode presently contemplated for carrying out the present invention.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

A preferred form of the present log trailer load booster is shown generally in the drawings by the reference numeral 10. It is noted that the booster 10 may be manufactured and provided separately from a log trailer 12, for mounting as a retrofit to the trailer 12. Alternatively, the present booster 10 may be manufactured in combination with a log trailer. In either instance the booster is intended to selectively accept a portion of the trailer payload (weight of logs) that would otherwise be borne by the axles 14 of the trailer.

To enable better understanding of the present booster, further brief description of the log trailer 12 will first be given. It should be understood however that the truck, trailer, and components thereof may be of a conventional nature. Many forms of log trailers are presently produced with features readily known to those of ordinary skill in log is truck and trailer design and manufacturing arts. Thus for brevity, only those general features of the log trailer and truck that deal directly with mounting and operation of the present booster 10 will be described.

Figure 1:
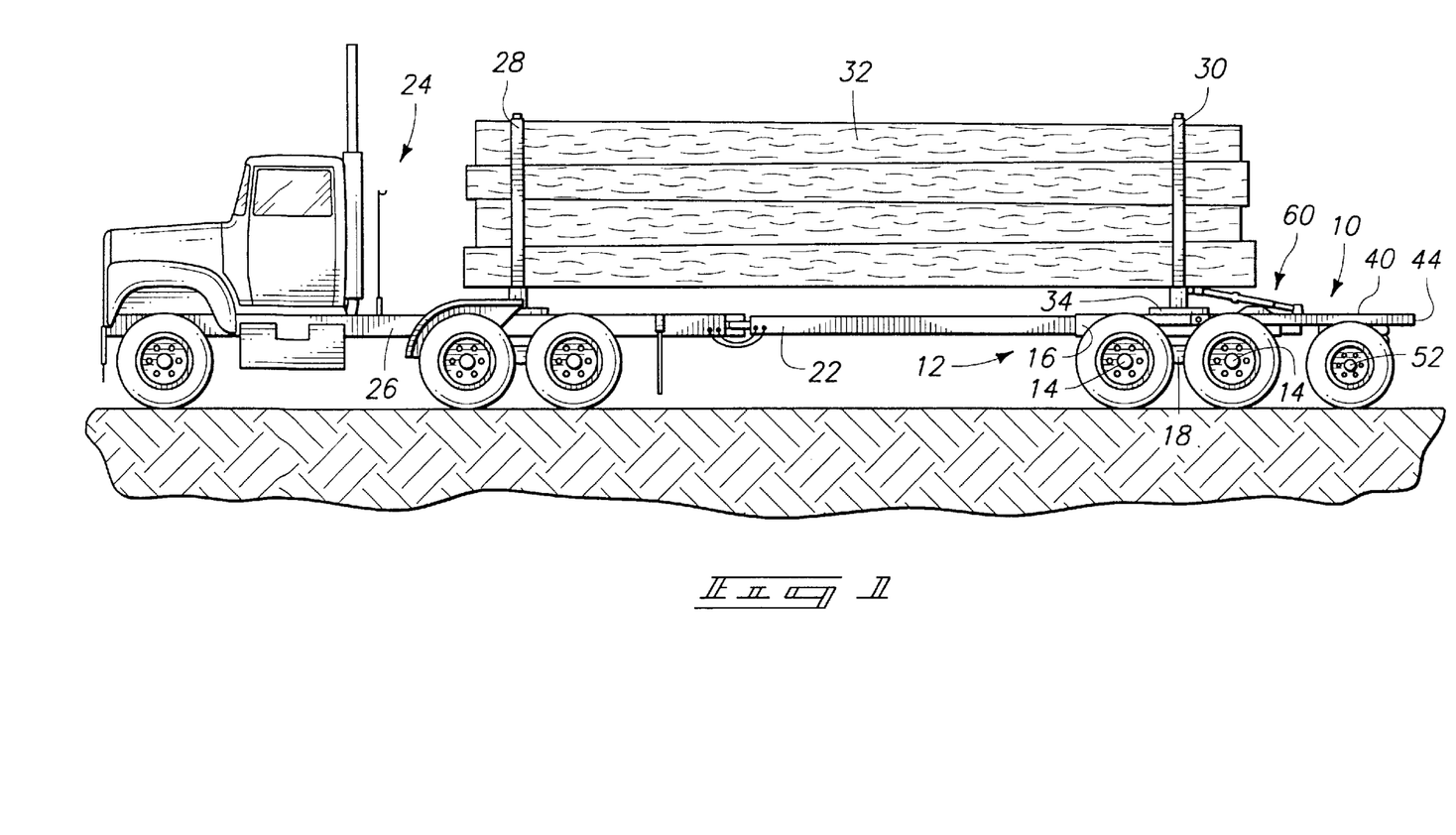
FIG. 1 is a side elevation view of a logging truck and attached trailer carrying a payload of logs with a preferred form of the present log trailer load booster mounted to the log trailer.

The trailer 12 includes one or more conventional trailer axles 14 carried by an appropriate log trailer suspension 18 under the rigid trailer frame 16. An elongated beam or "reach" 22 extends from the frame 16 for pivotal connection to a logging truck 24 (FIG. 1).

The truck chassis 26 supports a forward truck mounted payload receiving bunk 28, and the trailer frame 16 supports a similar rearward trailer mounted payload receiving bunk 30. The bunks 28 and 30 are supported on the respective truck chassis 26 and trailer frame 16 and are pivotable about parallel upright bunk pivot axes. Bunks 28 and 30 are substantially "U"-shaped to receive and support a payload of logs 32.

Figure 3:
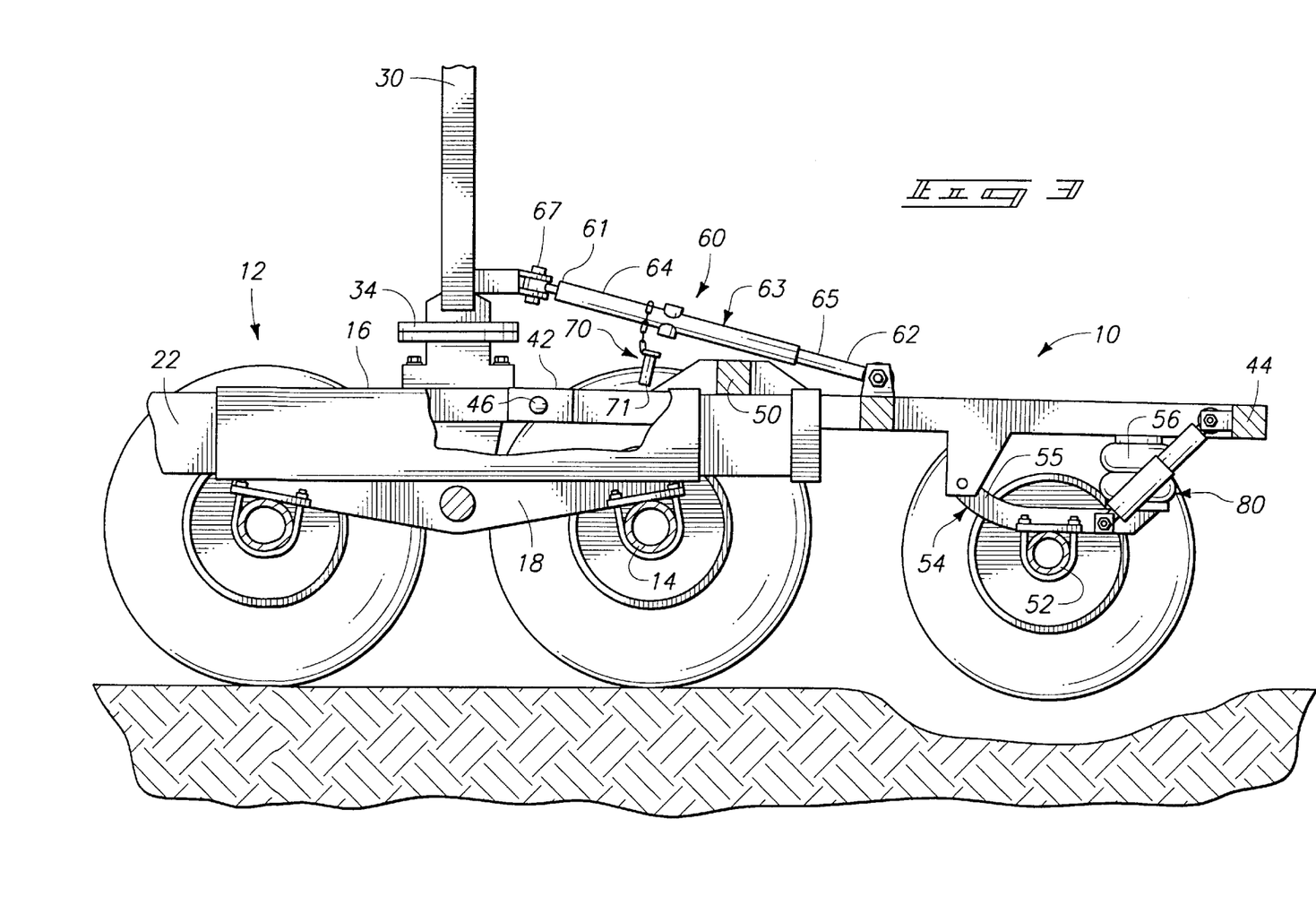
FIG. 3 is a sectional view showing the trailer partially fragmented and the log trailer load booster being carried over a depression.
Figure 5:
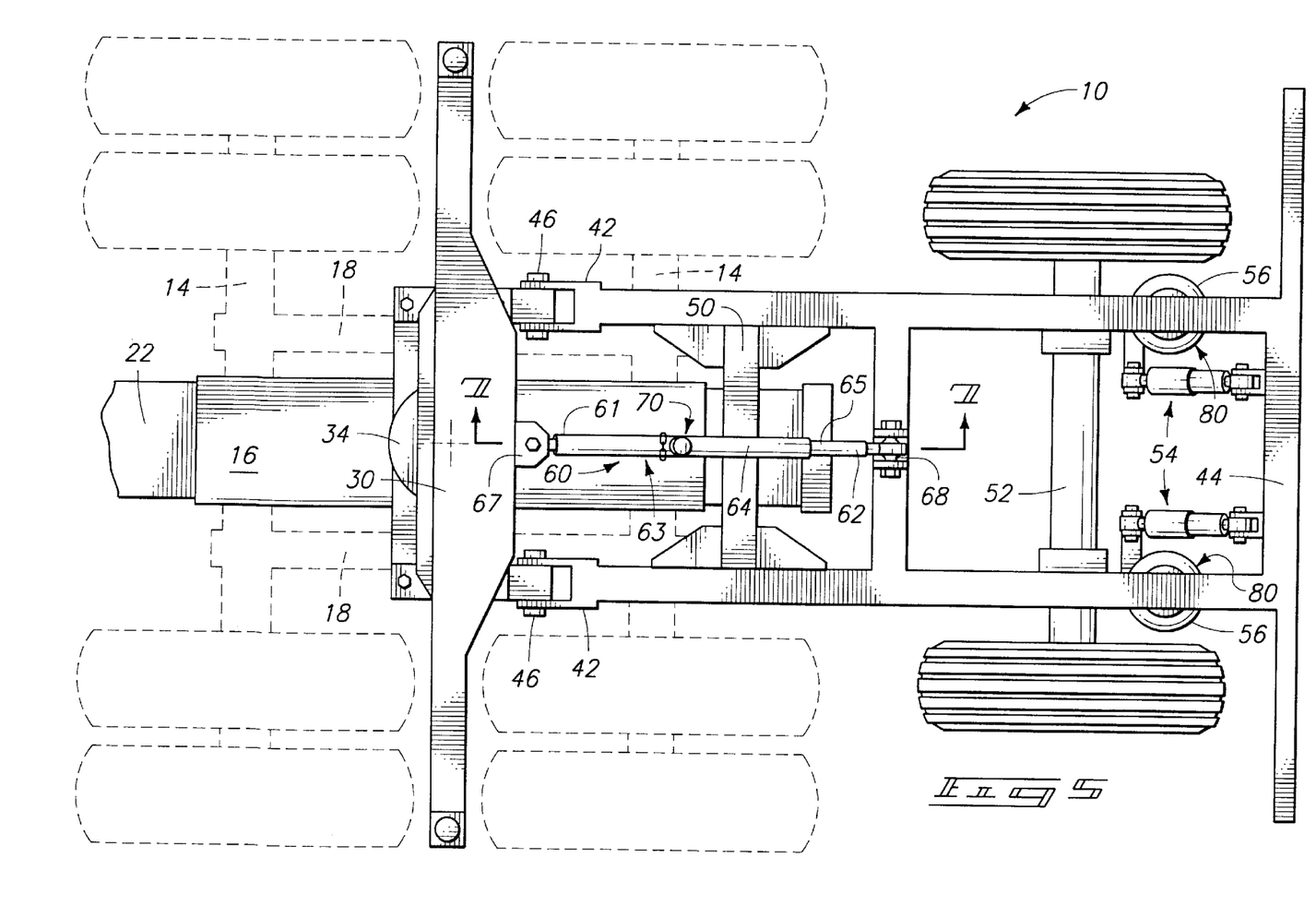
FIG. 5 is a top plan view of the booster and a portion of a log trailer, with part of the log trailer being shown by dashed lines for clarity of description.
Figure 6:
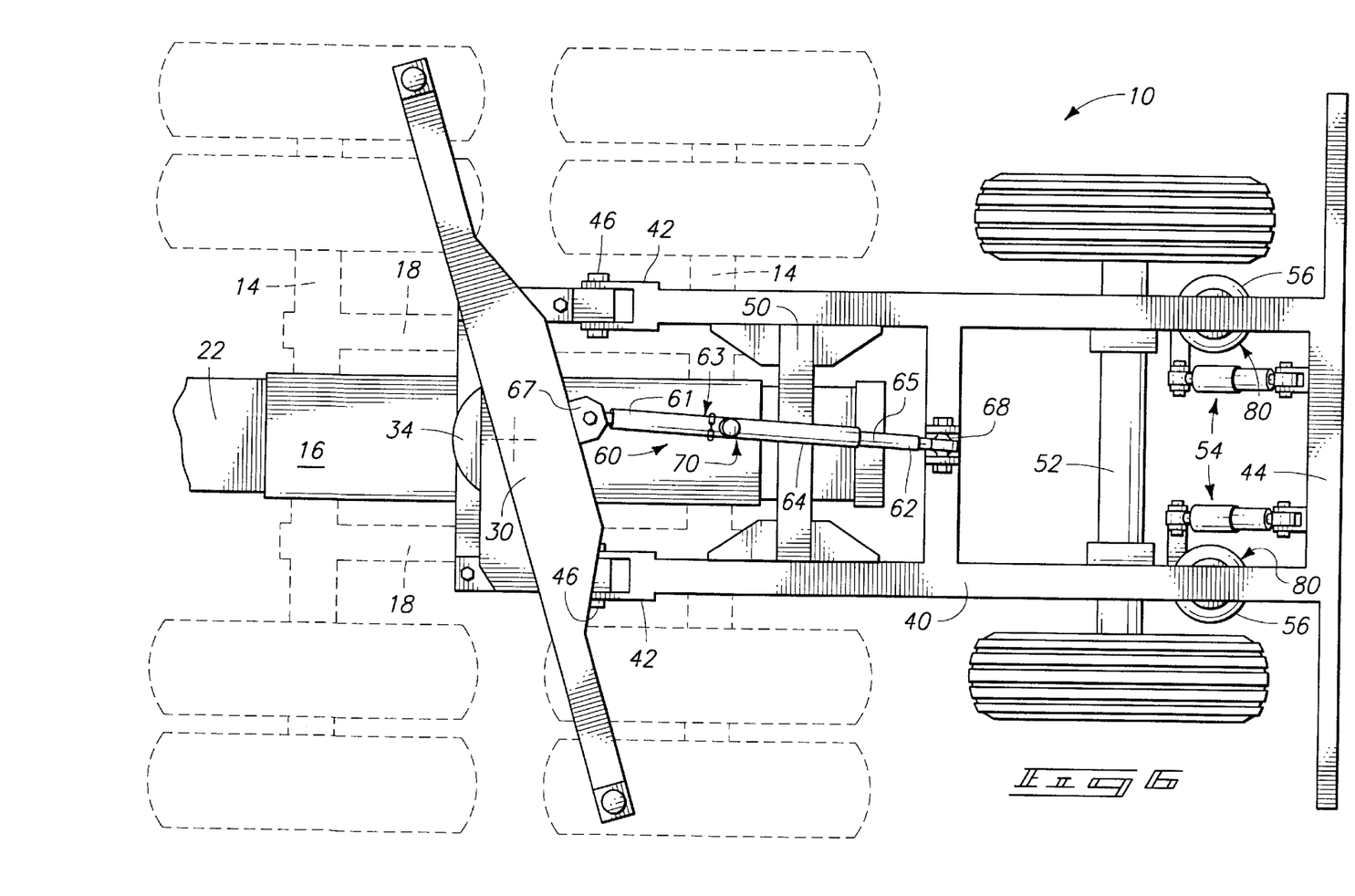
FIG. 6 is a view similar to FIG. 5 only showing the payload receiving bunk of the log trailer pivoted and corresponding positioning of a link member of the preferred log trailer load booster.

In FIG. 3 a turntable bearing 34 is shown pivotably mounting the bunk 30 to the trailer frame 16. The bearing 34 defines the central upright pivot axis for the bunk 30. FIGS. 5 and 6 show the bunk 30 in two different angular positions to exemplify the pivotal nature of the bunk about the upright bunk axis.

The bunk 30 will pivot relatively freely when no load is carried. However a payload of logs 32 (as shown in FIG. 1) will mechanically connect the bunks 28, 30 which will then pivot only as the truck 24 and trailer 12 move around a curve. FIG. 6 thus indicates relative positions of the bunk 30 and trailer frame when the truck is making a left hand turn. FIG. 5 indicates relative positions of the bunk 30 and trailer frame 16 when the truck 24 is moving straight ahead or backing in a straight line.

The preferred log trailer load booster 10 includes an elongated booster frame 40 having a forward end 42 and a rearward end 44. The booster frame 40 as shown is substantially "H" shaped in plan view (FIGS. 5, 6) and is preferably formed of rigid materials such as welded steel channel.

Figure 4:
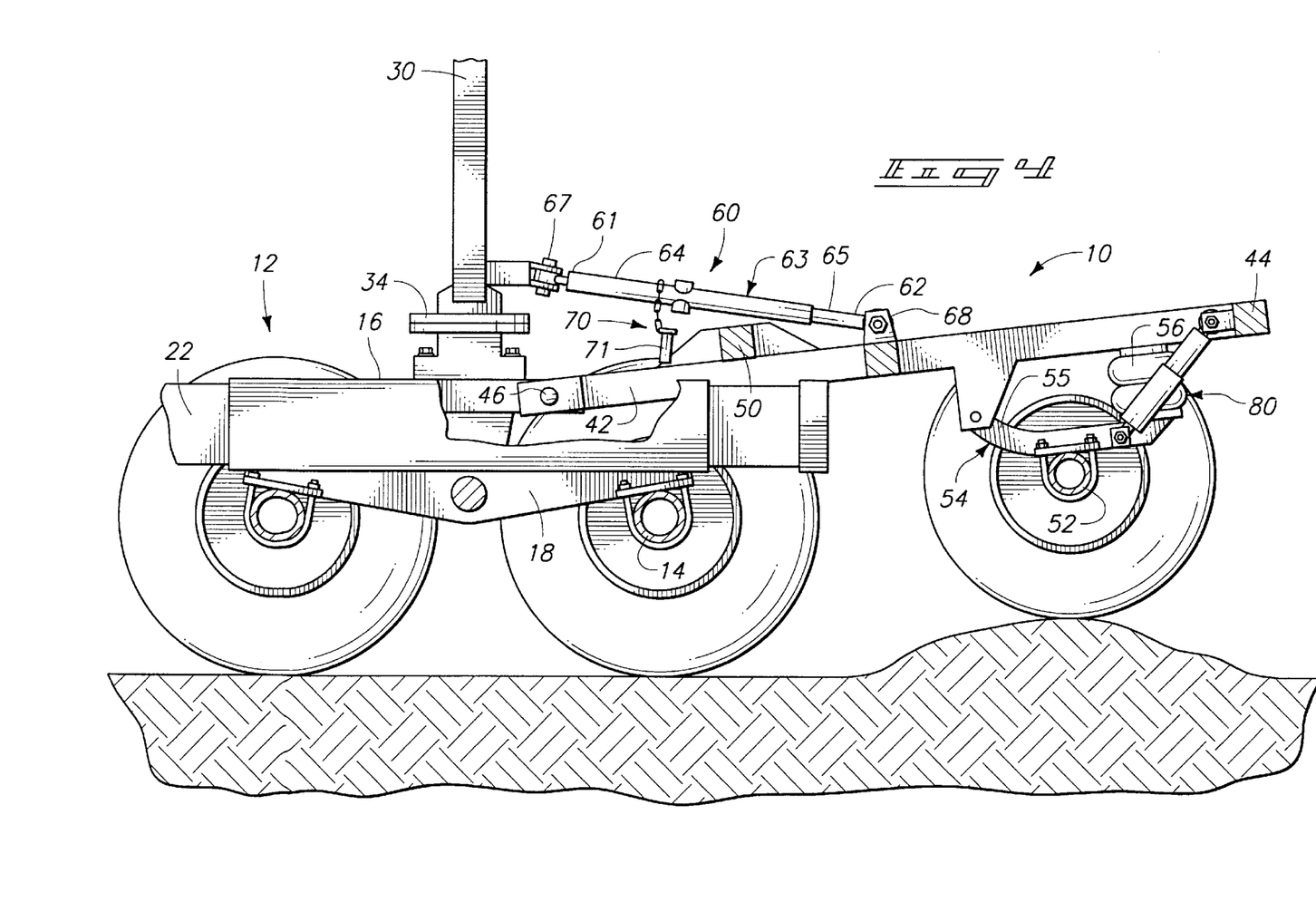
FIG. 4 is a view similar to FIG. 3 only showing the preferred log trailer load booster moving over a rise in the roadway.

At least one and preferably two pivot connections 46 are provided on the booster frame 40, configured to pivotably connect the booster frame 40 to the trailer frame for up and down pivotal movement thereon about a horizontal axis. The pivot connections 46 are preferably situated at the forward end 42 of the booster frame and include heavy steel pins that extend through appropriate aligned holes formed in the booster frame and trailer frame. Pivotal movement of the booster frame relative to the trailer frame is demonstrated by FIGS. 3 and 4. FIG. 3 shows the booster frame 40 in a down position, in substantial horizontal alignment with the trailer frame 16. FIG. 4 shows the booster frame pivoted upwardly about the horizontal axis. In both illustrated positions the booster is shown in a freely pivotable "floating" mode.

A stop 50 is advantageously provided on the booster frame 40, and is positioned thereon to engage the trailer frame 16 and limit downward pivotal motion of the booster frame. The stop 50 may simply be comprised of a cross member welded or otherwise secured to the booster frame in a position to engage the trailer frame 16 as shown in FIG. 3 to prevent the booster frame 40 from swinging too far downwardly. This is done primarily so the trailer frame will carry the booster frame in a stable condition when the entire trailer is lifted for placement onto the truck or for removal from the truck.

A booster axle 52, mounting conventional wheels and tires, is provided on the booster frame, and is mounted thereto by a suspension 54. A preferred suspension 54 is produced by Watkins & Chalin Mfg. Inc. at 2050-T, Couch Dr., McKinney, Tex. USA 75609, model number TA-1200-5. The suspension includes arm assemblies 55 (FIGS. 3, 4) that are pivotably mounted to the booster frame and which provide brackets for securing the axle 52. The arm assemblies 55 also provide mounts for air springs 56 which are situated between the arms 55 and booster frame 40. The air springs 56 may be connected to an appropriate source of pressurized air (not shown) but which is typically supplied on the truck and is well known in the trucking and suspension arts. The air springs 56 may be selectively inflated to produce lifting forces against the booster frame 40.

A link 60 is provided in preferred forms of the present booster 10 for connecting the trailer frame 16 and booster frame 40, and which is selectively operable between (a) a locked condition (a weight transfer mode) in which upward pivotal movement of the booster frame relative to the trailer frame about the horizontal axis is limited, and (b) an unlocked condition (freely suspended mode) in which the booster frame is allowed substantially free pivotal movement about the horizontal axis relative to the trailer frame.

In a more specific form, the link 60 is elongated and configured at a forward end 61 to be pivotably connected to the bunk 30 and at a rearward end 62 to be connected to the booster frame 40. It is preferable that the link be extendible and retractable along its length. This is done to accommodate pivotal motion of the bunk 30 as the truck and trailer move through turns (compare FIGS. 5 and 6).

Still more specifically, the link 60 is comprised of an elongated telescoping pressure arm 63 that is inclined from the forward end 61 downwardly to the rearward end 62. The telescoping pressure arm 63 may be constructed of two slidably telescoping members 64, 65. One of the members 64 is tubular and slidably receives the other member 65.

The preferred link 60 further includes a forward ball joint 67 that is provided at the forward link end 61 and configured for attachment to the bunk 30. A similar, rearward ball joint 68 pivotably secures the rearward link end 62 to the booster frame 40. The joints 67, 68 are provided to permit pivotal movement of the link 60, yet retain structural connection between the bunk and booster frame. The ball joint connections are laterally centered on the bunk and booster frame (as shown in FIG. 5), with the forward ball joint 67 being connected to the bunk 30 adjacent to the upright bunk axis (shown by intersecting center line in FIG. 6).

Figure 7:
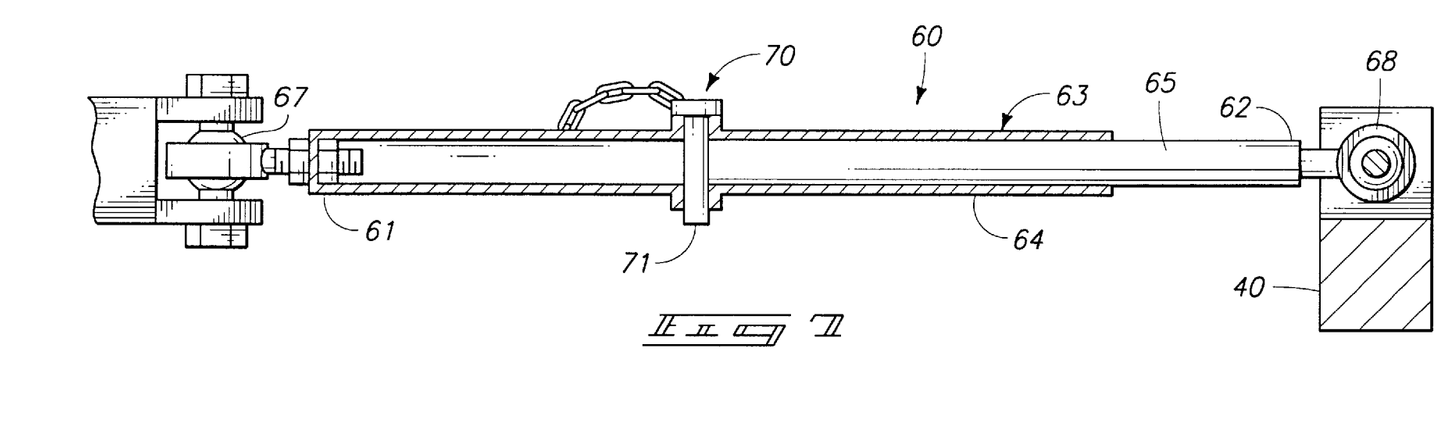
FIG. 7 is an enlarged sectional view of the link member.

A stop or lock device 70 is provided on the link 60 and is selectively operable to limit retraction of the link beyond a locked position. The lock device 70 is mounted on one of the telescoping members and is configured to prevent the telescoping members from retracting beyond the locked condition. FIG. 7 shows the link 60 in the locked condition and FIGS. 3 and 4 show the link in the unlocked condition. It is noted that in the locked condition, the link 60 is still able to freely extend unless other forces are acting to hold the link in the contracted state.

The lock device may be comprised of a pin 71 that may be selectively inserted in a bore formed in one of the telescoping members and in the sliding path of the other member. More particularly, the bore may be formed as shown in FIG. 7 in telescoping member 64 to receive the pin 71. The pin 71 is thus positioned to stop the other member 65 from retracting any further into member 64. The two members 64, 65 thus become as a single rigid compression member in the locked condition and any forces tending to further compress the members will be transmitted directly to the bunk 30 and booster frame 40.

A load transfer device 80 is mounted to the booster frame 40 and is selectively operable to axially force the link 60 (when in the locked condition) against the bunk 30 and thereby transfer payload to the booster axle 52. In preferred forms, the load transfer device 80 is integral with the booster suspension 54, particularly the air springs 56 which can be selectively inflated to produce a lifting force against the booster frame. This lifting force is translated through the link 60 (when contracted and in the locked condition), which thereby reacts against the bunk 30. A proportional part of the payload is thus shifted to the log trailer load booster 10.

The above of course assumes the booster tires are resting against a stationary road or other surface. Otherwise the air springs would tend to swing the suspension arm assemblies 55 downward.

It is of interest to note that the telescoping members 64, 65 comprising link 60 may be locked only against compressive forces. Extension of the telescoping members (which is coincidental with downward pivotal movement of the booster frame 30) is limited only as the stop 50 comes to rest against the trailer frame 16. The present log trailer load booster is thus allowed a significant degree of travel, through which the booster tires will normally remain in firm contact with the ground surface (except in extreme situations as shown by FIG. 3).

Operation of the present log trailer load booster will be described assuming the unit is installed and the truck has been loaded at a landing along a rough dirt road. The driver first removes the locking pin 71, thereby allowing the link to extend and contract freely with up and down pivotal movement of the booster frame 30. The booster frame 30 will therefor simply "float" in an inoperative freely suspended mode without carrying any load other than its own weight, thereby reducing strain on the unit and enhancing handling characteristics.

Upon arrival at a public highway or another area where load restrictions apply, the driver simply stops, goes back and inserts the pin 71 to limit compression of the link. This shifts the booster 10 to the weight transfer mode. Air pressure may now be applied to the load transfer device (air springs 56). Sufficient pressure may be applied to transfer a desired amount of the load otherwise carried by the trailer suspension to the log trailer load booster. Appropriate axle loading monitors may be used to determine the amount of load shifted to the booster (a practical range may be between approximately 6,000 and 8,000 lbs). Now the driver can proceed to drive the truck with the booster carrying a desired share of the payload. The booster 10 which will pivot only on the horizontal axis of the pivot connection 46 is non-steering and will not fishtail behind the trailer.

The truck and trailer will articulate normally as corners or turns are encountered. The rear bunk 30 will pivot left or right according to the direction of turn. Partial load re-distribution takes place as turning occurs, which is an advantage gained through the geometry of the present booster.

When the truck moves through a turn, the geometry of the truck and load is such that the rearward bunk 30 will shift about the upright axis relative to the trailer frame 16. The pivoting bunk would normally allow the telescoping members to slightly extend. However weight bearing on the trailer and booster and the lift produced by the air springs will not allow this to occur. Instead, the air springs are allowed to slightly lift the booster frame 30 to take up the slack, the result of which is a reduction of air spring pressure and an increase in loading on the trailer suspension. This has the effect of shifting at least part of the booster load weight back to the trailer suspension and tires. Drag on the non-steering booster is thereby minimized and the trailer will track normally through the turn. As the truck comes out of the turn, the bunk will shift back and the selected portion of the load will automatically shift back onto the booster.

The above is a function of the link connection between the bunk 30 and the booster frame 40. Further, the load shifting function is uniform due to the centered location of the link with respect to the bunk and booster frame.

After the truck is unloaded at the destination, the pressure applied to the air springs may be released, and the pin 71 may be removed in preparation for the next run. If the trailer is to be loaded onto the truck, ordinary hoist mechanisms may be used since the present booster is intended to be relatively light weight (a test unit weighed only approximately 1,800 lbs.).

Figure 2:
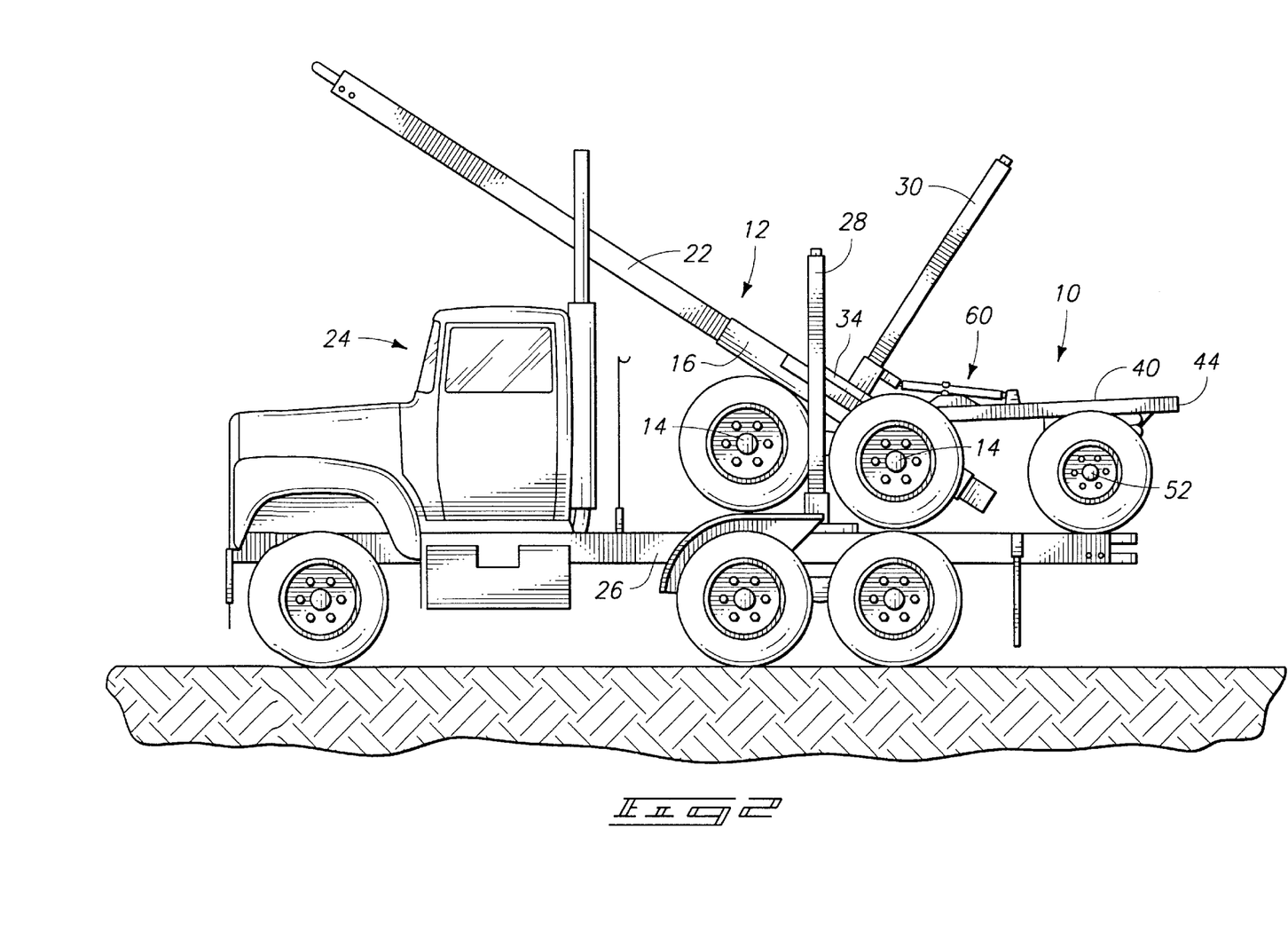
FIG. 2 is a side elevation view of the logging truck carrying the log trailer and present log trailer load booster.

As the trailer is lifted, the booster frame 30 will drop only until the stop 50 comes to rest on the trailer frame 16. The trailer frame will then carry the booster substantially as shown in FIG. 3 as the trailer is lifted onto the truck. When the trailer is lowered onto the truck, the booster wheels will come to rest on the truck chassis (FIG. 2). The unlocked link 60 will allow flex between the booster frame and trailer frame, thereby allowing the trailer to be lowered onto the truck in a substantially normal carrying position. The truck and trailer are now ready for another run.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A log trailer load booster for a log trailer having a wheeled trailer frame, a payload receiving bunk pivoted on the trailer frame about a substantially upright bunk axis, and an elongated trailer beam for connection to a log truck, the booster comprising:

an elongated booster frame having a forward end and a rearward end;

a pivot connection on the booster frame configured to pivotably connect the booster frame to the trailer frame for up and down pivotal movement thereon about a horizontal axis;

a stop on the booster frame positioned thereon to engage the trailer frame and limit down pivotal motion of the booster frame;

a booster axle on the booster frame a suspension between the booster axle and booster frame;

an elongated link configured at a forward end to be pivotably connected to the bunk and at a rearward end to be connected to the booster frame;

wherein the link is extendible and retractable;

a lock device on the link selectively operable to limit retraction of the link beyond a locked position; and a load transfer device mounted to the booster frame and selectively operable to axially force the link in the locked position against the bunk and transfer payload to the booster axle.

2. The log trailer load booster of claim 1 wherein the forward end of the link is configured for connection to the bunk adjacent the upright bunk axis.

3. The log trailer load booster of claim 1 wherein the load transfer device is integral with the suspension.

4. The log trailer load booster of claim 1 wherein the link is comprised of an elongated telescoping pressure arm.

5. The log trailer load booster of claim 1 wherein the link is comprised of an elongated telescoping pressure arm that is inclined from the forward end downwardly to the rearward end.

6. The log trailer load booster of claim 1 wherein the link is comprised of two slidably telescoping members that are extendible and retractable and wherein the lock device is mounted on one of the telescoping members and is configured to prevent the telescoping members from retracting beyond the locked position.

7. The log trailer load booster of claim 1 wherein the link includes an elongated telescoping pressure arm with a forward ball joint at the forward end, configured for attachment to the bunk, and a rearward ball joint pivotably secured to the booster frame.

8. The log trailer load booster of claim 1 wherein the link includes an elongated pressure arm with a forward ball joint at the forward end, configured for attachment to the bunk adjacent the upright bunk axis, and a rearward ball joint at the rearward end, pivotably secured to the booster frame.

9. The log trailer load booster of claim 1 wherein the load transfer device is integral with the suspension and in which the suspension is adjustable to selectively lift the booster frame relative to the booster axle.

10. The log trailer load booster of claim 1 wherein the load transfer device is integral with the suspension and is comprised of a selectively inflatable air spring positioned between the booster frame and the booster axle.

11. A log trailer load booster for a log trailer having a wheeled trailer frame, a payload receiving bunk on the trailer frame, and an elongated trailer beam for connection to a log truck, the booster comprising:
   an elongated booster frame having a forward end and a rearward end;
   a pivot connection on the booster frame configured to pivotably connect the booster frame to the trailer frame for up and down pivotal movement thereon about a horizontal axis;
   a booster axle on the booster frame;
   a suspension between the booster axle and booster frame;
   a link configured to connect the trailer frame and booster frame and selectively operable between a locked condition in which upward pivotal movement of the booster frame relative to the trailer frame about the horizontal axis is limited and an unlocked condition in which the booster frame is allowed substantially free pivotal movement about the horizontal axis relative to the trailer frame; and
   a load transfer device mounted to the booster frame and selectively operable to axially lift the booster frame about the horizontal axis with respect to the booster axle against the link in the locked condition to transfer payload to the booster axle.

12. The log trailer load booster of claim 11 wherein the booster frame and pivot connection are configured to extend rearwardly of the trailer frame.

13. The log trailer load booster of claim 11 wherein the load transfer device is integral with the suspension and in which the suspension is adjustable to selectively lift the booster frame relative to the booster axle.

14. The log trailer load booster of claim 11 in which the link is configured to interconnect the payload receiving bunk and the booster frame.

15. A log trailer, comprising:
   a trailer frame;
   a trailer axle below the trailer frame;
   a payload receiving bunk on the trailer frame above the trailer axle;
   an elongated trailer beam on the trailer frame extending forwardly of the trailer frame for connection to a log truck;
   an elongated booster frame having a forward end and a rearward end;
   a pivot connection on the booster frame pivotably connecting an end of the booster frame to the trailer frame for up and down pivotal movement thereon about a horizontal axis;
   a booster axle on the booster frame;
   a suspension between the booster axle and booster frame;
   a link on the booster frame connecting the trailer frame and booster frame and selectively operable between a locked condition in which upward pivotal movement of the booster frame relative to the trailer frame about the horizontal axis is limited and an unlocked condition in which the booster frame is allowed substantially free pivotal movement about the horizontal axis relative to the trailer frame; and
   a load transfer device mounted to the booster frame and selectively operable to pivot the booster frame upwardly about the horizontal axis with respect to the booster axle against the link in the locked condition to transfer payload to the booster axle.

16. The log trailer of claim 15 wherein the bunk is pivotable about an upright bunk axis; and
   wherein the link is elongated and includes a forward end and a rearward end and wherein the forward end of the link is connected to the bunk adjacent the upright bunk axis.

17. The log trailer of claim 15 wherein the link is comprised of a telescoping pressure arm that is extendible and retractable and includes a forward end and a rearward end and wherein the forward end of the pressure arm is connected to the bunk and the rearward end is connected to the booster frame; and
   wherein the lock device is comprised of a stop on the telescoping pressure arm that is selectively operable to permit extension of the pressure arm and limit retraction of the pressure arm.

18. The log trailer of claim 15 wherein the load transfer device is integral with the suspension.

19. The log trailer of claim 15 wherein the link is comprised of an elongated telescoping pressure arm.

20. The log trailer of claim 15 wherein the link is comprised of an elongated telescoping pressure arm that is inclined from a forward end mounted to the bunk to a rearward end mounted to the booster frame.

21. The log trailer of claim 15 wherein the link is comprised of two slidably telescoping members that are extendible and retractable and wherein the lock device is mounted on one of the telescoping members and is configured to prevent the telescoping members from retracting beyond the locked position.

22. The log trailer of claim 15 wherein the bunk is pivotably mounted to the trailer frame for relatively free pivotal movement about an upright bunk axis;

wherein the link includes an elongated telescoping pressure arm with a forward ball joint at a forward end, mounted to the bunk, and a rearward ball joint at a rearward end pivotably secured to the booster frame.

23. The log trailer of claim 15 wherein the bunk is pivotably mounted to the trailer frame about an upright bunk axis;

wherein the link includes an elongated pressure arm with a forward ball joint at a forward end, attached to the bunk adjacent the upright bunk axis, and a rearward ball joint at the rearward end, pivotably secured to the booster frame.

24. The log trailer of claim 15 wherein the load transfer device is integral with the suspension and in which the suspension is adjustable to selectively lift the booster frame relative to the booster axle.

25. The log trailer of claim 15 wherein the load transfer device is integral with the suspension and is comprised of a selectively inflatable air spring positioned between the booster frame and the booster axle.

* * * * *